(12) United States Patent
Zhao et al.

(10) Patent No.: US 10,783,003 B2
(45) Date of Patent: Sep. 22, 2020

(54) METHOD, DEVICE, AND COMPUTER READABLE MEDIUM FOR MANAGING DEDICATED PROCESSING RESOURCES

(71) Applicant: EMC IP Holding Company LLC, Hopkinton, MA (US)

(72) Inventors: Junping Zhao, Beijing (CN); Kun Wang, Beijing (CN); Fan Guo, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 80 days.

(21) Appl. No.: 16/173,004

(22) Filed: Oct. 29, 2018

(65) Prior Publication Data
US 2019/0171487 A1 Jun. 6, 2019

(30) Foreign Application Priority Data
Oct. 27, 2017 (CN) .......................... 2017 1 1025182

(51) Int. Cl.
| | |
|---|---|
| *G06F 9/50* | (2006.01) |
| *H04L 29/06* | (2006.01) |
| *H04L 12/24* | (2006.01) |
| *H04L 12/911* | (2013.01) |
| *G06F 9/48* | (2006.01) |
| *G06F 21/60* | (2013.01) |
| *G06F 21/62* | (2013.01) |

(52) U.S. Cl.
CPC .......... *G06F 9/5027* (2013.01); *G06F 9/4881* (2013.01); *G06F 9/5011* (2013.01); *G06F 21/604* (2013.01); *G06F 21/6281* (2013.01); *H04L 41/0803* (2013.01); *H04L 41/5029* (2013.01); *H04L 47/70* (2013.01); *H04L 63/10* (2013.01)

(58) Field of Classification Search
CPC .............. G06F 16/2471; G06F 16/278; G06F 16/2228; G06F 16/24535; H04L 67/1097; H04L 67/2804; H04L 67/10
See application file for complete search history.

(56) References Cited

U.S. PATENT DOCUMENTS

| | | | |
|---|---|---|---|
| 9,720,989 B2* | 8/2017 | Theimer | G06F 16/258 |
| 10,409,648 B1* | 9/2019 | Bhatia | G06F 9/5083 |
| 2007/0150699 A1* | 6/2007 | Schoinas | H04L 45/00 712/13 |
| 2011/0072234 A1* | 3/2011 | Chinya | G06F 12/1027 711/207 |

(Continued)

*Primary Examiner* — Chirag R Patel
(74) *Attorney, Agent, or Firm* — Ryan, Mason & Lewis, LLP

(57) ABSTRACT

Embodiments of the present disclosure relate to a method, a device and a computer readable medium for managing a dedicated processing resource. According to the embodiments of the present disclosure, a server receives a request of a first application from a client, and based on an index of a resource subset as comprised in the request, determines a dedicated processing resource corresponding to the resource subset for processing the first application request. According to the embodiments of the present disclosure, the dedicated processing resource is divided into a plurality of resource subsets, so that the utilization efficiency of the dedicated processing resource is improved.

20 Claims, 5 Drawing Sheets

(56) References Cited

U.S. PATENT DOCUMENTS

| | | | |
|---|---|---|---|
| 2014/0281118 A1* | 9/2014 | Hepkin | G06F 9/45533 711/6 |
| 2015/0100601 A1* | 4/2015 | Leggette | G06F 3/0635 707/781 |
| 2016/0036913 A1* | 2/2016 | Romem | G06F 15/167 709/219 |

* cited by examiner

METHOD, DEVICE, AND COMPUTER READABLE MEDIUM FOR MANAGING DEDICATED PROCESSING RESOURCES

RELATED APPLICATIONS

This application claims priority from Chinese Patent Application Number CN 201711025182.8, filed on Oct. 27, 2017 at the State Intellectual Property Office, China, titled "METHOD, DEVICE AND COMPUTER-READABLE MEDIUM FOR MANAGING DEDICATED PROCESSING RESOURCES" the contents of which are incorporated herein by reference in their entirety.

FIELD

Embodiments of the present disclosure generally relate to managing dedicated processing resources, and more specifically, to a method, a device and a computer readable medium for managing dedicated processing resources.

BACKGROUND

Applications on a client can be designed to complete various processing or analyzing tasks using computing resources, such as processing and storage resources. As the requirement and complexity of the tasks, such as machine learning, deep learning, and data mining, continuously grows, a large amount of and/or variable computing resources are required to satisfy the operations of the corresponding application. This can be implemented with a machine or a system having a plurality of dedicated processing resources, where the applications can be scheduled to operate on one or more dedicated processing resources of the machine or system. For example, a cloud-based computing system has already been developed, and this computing system includes a machine having one or more dedicated processing resources. Different clients can rent computing resources (for example, dedicated processing resources) of the system as required to operate their own applications.

However, as the computing capability of dedicated processing resources is increased continuously, it is worth studying the issue concerning how to make more rational use of dedicated processing resources.

SUMMARY

Embodiments of the present disclosure provide a method, a device and a corresponding computer program product for storage management.

According to a first aspect of the present disclosure, a method for managing a dedicated processing resource is provided. The method comprises receiving, from a client, a request of a first application. The request of the first application comprises an index of a first resource subset. The first resource subset is one of a plurality of resource subsets generated by dividing the dedicated processing resource. The plurality of resource subsets has corresponding indexes. The dedicated processing resource comprises at least one of a computing resource and a storage resource. The method further comprises obtaining a mapping between the dedicated processing resource and the plurality of resource subsets. The method further comprises determining, based on the index of the first resource subset, the dedicated processing resource corresponding to the first resource subset from the mapping for processing the request of the first application.

According to a second aspect of the present disclosure, a device for managing a dedicated processing resource is provided. The device comprises at least one processor and a memory coupled to the at least one processor. The memory has instructions stored thereon. The instructions, when executed by the at least one processor, cause an electronic device to perform acts including: receiving, from a client, a request of a first application. The request of the first application comprises an index of a first resource subset. The first resource subset is one of the plurality of resource subsets generated by dividing the dedicated processing resource. The plurality of resource subsets has corresponding indexes. The dedicated processing resource comprises at least one of a computing resource and a storage resource. The acts further comprise obtaining a mapping between the dedicated processing resource and the plurality of resource subsets. The acts further comprise determining, based on the index of the first resource subset, the dedicated processing resource corresponding to the first resource subset from the mapping for processing the request of the first application.

According to a third aspect of the present disclosure, a computer readable medium is provided. The computer readable medium has instructions stored thereon, the instructions, when executed by at least one dedicated processing resource of a machine, causing the machine to implement the method according the first aspect.

The Summary introduces a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the more detailed description of the example embodiments of the present disclosure with reference to the accompanying drawings, where the same reference sign generally refers to the like element in the example embodiments of the present disclosure.

DETAILED DESCRIPTION OF EMBODIMENTS

Figure 1:
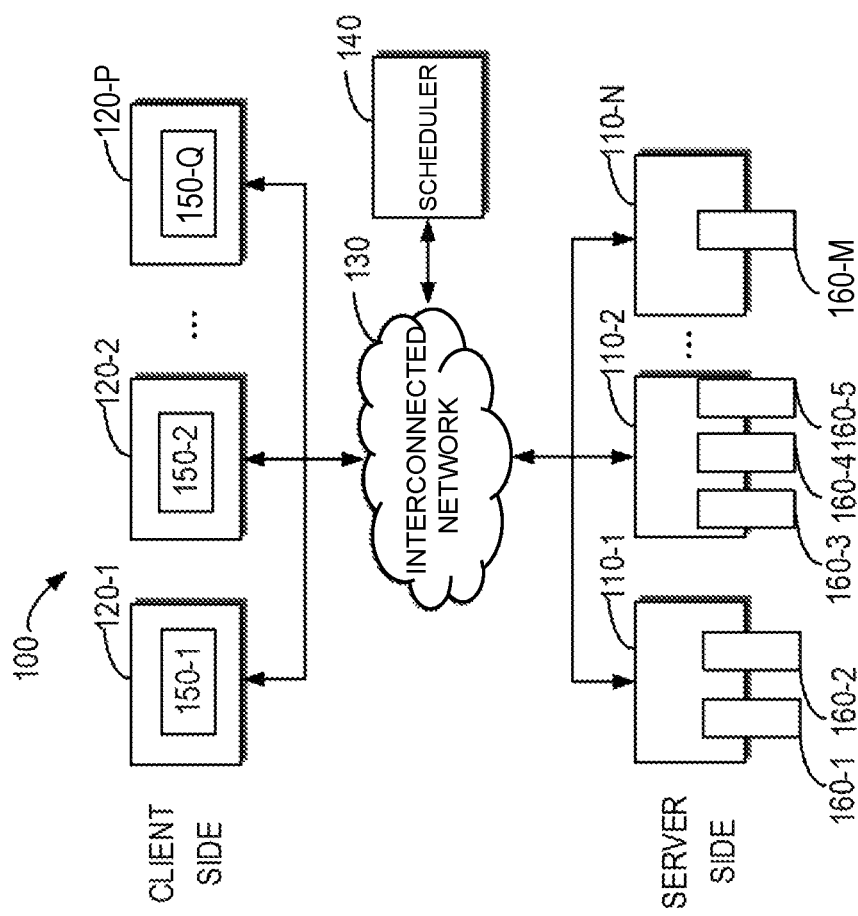
FIG. 1 shows a schematic block diagram of a system in which some embodiments of the present disclosure can be implemented.

Preferred embodiments of the present disclosure will be described in more detail with reference to the drawings. Although the preferred embodiments of the present disclosure are illustrated in the drawings, it should be understood that the present disclosure can be implemented in various manners, not limited to the embodiments illustrated herein. Rather, these embodiments are provided to make the present disclosure more thorough and complete and to fully convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one other embodiment." The terms "a first", "a second" and others can refer to same or different objects. The following text may also contain other explicit and implicit definitions.

As described above, the dedicated processing resources can be provided locally at the client or by a remote machine or system. In some examples, a cloud-based computing system can be deployed, which includes a plurality of machines having one or more dedicated processing resources. The dedicated processing resources of the computing system can be utilized by different clients based on their needs to schedule the corresponding applications to operate on available dedicated processing resources.

FIG. 1 is a schematic diagram illustrating an example computing system 100 in which embodiments of the present disclosure can be implemented. A plurality of servers for running applications, including server 110-1, server 110-2, . . . , server 110-N (hereinafter collectively referred to as server 110, where N is a natural number greater than 1), is deployed in the computing system 100. The server 110 may be a physical or virtual machine. For example, the server 110 may be a logic, container or virtual machine deployed at a data center or a private or public cloud, or may be a physical server or a computing device, etc. The computing system 100 further includes a dedicated processing resource 160-1, a dedicated processing resource 160-2, a dedicated processing resource 160-3, a dedicated processing resource 160-4, a dedicated processing resource 160-5, . . . , and a dedicated processing resource 160-M (hereinafter collectively referred to as dedicated processing resource 160, where M is a natural number greater than 1). Each of the servers 110 has one or more dedicated processing resources 160.

In the example of FIG. 1, the server 110-1 has two dedicated processing resources 160 (i.e. the dedicated processing resource 160-1, the dedicated processing resource 160-2), the server 110-2 has three dedicated processing resources 160 (i.e. the dedicated processing resource 160-3, the dedicated processing resource 160-4, the dedicated processing resource 160-5), and the server 110-N has one dedicated processing resource (i.e. the dedicated processing resource 160-M). The dedicated processing resources 160 may be application-specific dedicated processing resources or general-purpose dedicated processing resources. Examples of the dedicated processing resource 160 may include, but are not limited to, a Graphics Processing Unit (GPU), a Field Programmable Gate Array (FPGA), or the like. For the sake of discussion, some embodiments will take a GPU as an example of the dedicated processing resources. In addition to the dedicated processing resources 160, the server 110 may further include, for example, one or more general processing units such as a central processing unit (CPU) (not shown).

FIG. 1 illustrates a plurality of clients 120-1, 120-2, . . . , 120-P (hereinafter collectively or individually referred to as a client 120, where P is a natural number greater than 1) respectively having applications 150-1, 150-2, . . . , 150-Q (hereinafter collectively referred to as an application 150, where Q is a natural number greater than 1) to run on. The application 150 may be any application running on the machine, and the application can be designed to perform corresponding data processing or analyzing tasks. As an example, the application 150 can perform data processing or analyzing tasks associated with high performance computing (HPC), machine learning (ML) or deep learning (DL), and artificial intelligence (AI), and/or the like. In order to quickly and efficiently run these applications and/or save local processing resources, the client 120 may request the dedicated processing resource 160 of the server 110 to run these applications 150. In such implementation, the client 120 may be connected via an interconnected network 130 to one or more servers 110 and hand over the applications 150 to run by one or more dedicated processing resources 160 of the server 110. The interconnected network 130 can support different types of wired or wireless connections of various network transmission techniques, such as, remote direct memory access (RDMA), transmission control protocol (TCP) or the like, depending on interfaces supported by the clients 120, the server 110 and/or the dedicated processing resource 160.

It should be understood that the device and/or arrangement shown in FIG. 1 is provided as an example only. In other examples, the computing system 100 can include any suitable number of servers 110 and clients 120. Each of the servers 110 can be mounted with any suitable number of dedicated processing resources 160 and each of the clients 120 can have a plurality of applications 150 to run on. In addition, a scheduler 140, although separately shown, can be implemented by other devices independent of the servers 110 in practical applications, or can be implemented at least in part on one or more servers 110.

To describe in a clear and concise manner, example embodiments of the present disclosure will be described in detail by mainly taking the GPU kernel as an example. It is known that GPU, as a dedicated processor, has strong computing capability due to its large amount of kernels and high-bandwidth memory. In the hardware architecture of GPU, one GPU usually has a large amount of GPU kernels, for example, 5120 or up to 10000 kernels. The GPU kernel, as a dedicated processing resource, is the most basic processing unit, which is also known as a stream processor (SP). Instructions and tasks are eventually processed on the GPU kernel. A plurality of GPU kernels simultaneously executes the instructions to implement parallel computing of the GPU. A plurality of SPs, in addition to other resources such as a register and a shared memory, can compose one stream multiprocessor (SM).

However, it should be understood that GPU is only one example of a dedicated processing resource, and shall not limit the scope of the present disclosure. Spirits and principles described herein can be applied into other dedicated processing resources, for example processing resources in an accelerator such as a Field Programmable Gate Array (FPGA) currently known or to be developed in the future, without limiting to the GPU kernel only.

As described above, as the computing capability of dedicated processing resources such as a GPU is increased continuously, the issue concerning rational utilization of dedicated processing resources is well worthy of study, which is missing in traditional application of dedicated processing resources, such as dedicated processing resources for game playing. With the increase of the computing capability of dedicated processing resources, it is a great waste that one physical dedicated processing resource is exclusively owned by one application or container. Therefore, there is a need to partition a dedicated processing resource into a plurality of resource subsets that are logically independent of one another, so as to support multiple applications running concurrently. However, compared with partitioning a traditional resource like a CPU, there are some challenges to partition a dedicated processing resource. For example, hardware of a dedicated processing resource does not support partitioning of hardware level resource (i.e. hardware level virtualization). Therefore, there is a need for a technical solution for partitioning a dedicated processing resource into a plurality of resource subsets that are logically independent of one another, so as to support multiple applications running concurrently.

Figure 2:
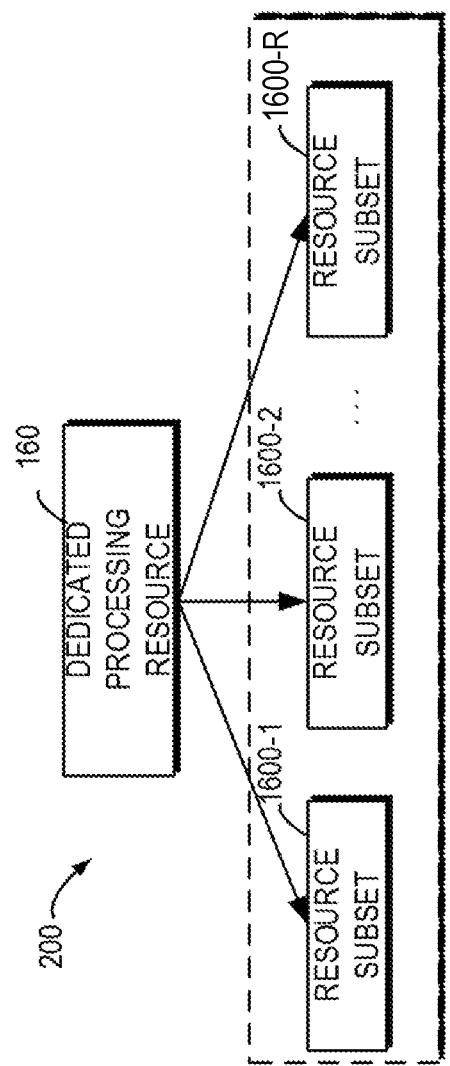
FIG. 2 shows a schematic block diagram for dividing dedicated processing resources according to some embodiments of the present disclosure.
Figure 3:
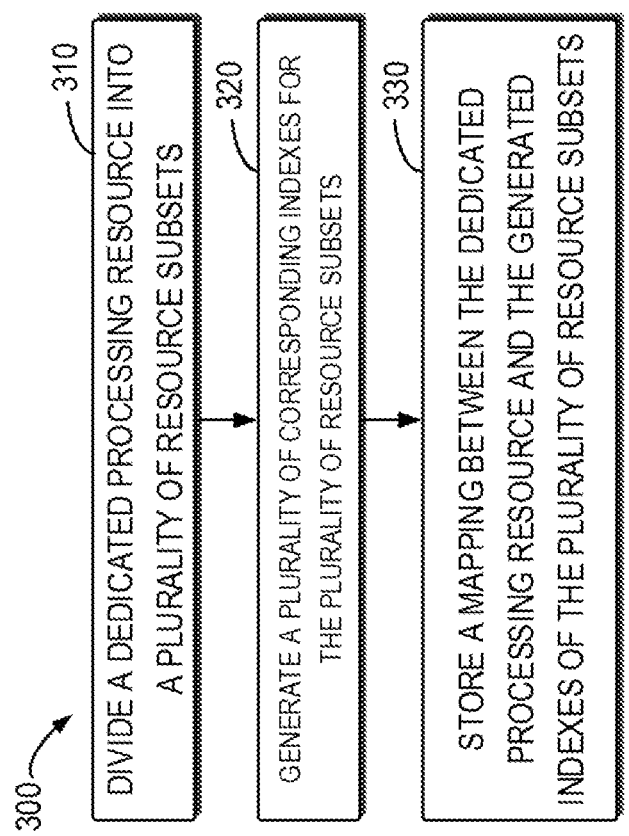
FIG. 3 shows a flowchart of a procedure or a method for dividing dedicated processing resources according to some embodiments of the present disclosure.

FIG. 2 shows a schematic block diagram 200 for partitioning a dedicated processing resource according to some embodiments of the present disclosure. As depicted, the dedicated processing resources 160 are partitioned at the software layer into a resource subset 1600-1, a resource subset 1600-2, . . . , a resource subset 1600-R that are logically independent of one another (hereinafter collectively referred to as a resource subset 1600, where R is a natural number greater than 1). FIG. 3 shows a flowchart of a method 300 for partitioning a dedicated processing resource according to some embodiments of the present disclosure. Now illustration of partitioning a dedicated processing resource according to some embodiments of the present disclosure is presented in conjunction with FIGS. 2 and 3. It should be noted that for the sake of illustration, the GPU is taken as an example. It may be understood that the embodiments of the present disclosure may also effect partitioning of a dedicated processing resource such as a FPGA. The embodiments of the present disclosure are not limited herein.

At block 310, the server 110 partitions the dedicated processing resource 160 into a plurality of resource subsets 1600. As an example, in traditional technology, one virtual GPU is usually created for one physical GPU, i.e., there are the same number of physical GPUs and virtual GPUs, thereby causing a waste of GPU resources. As described above, one GPU usually has a large amount of GPU kernels and storage resources. The server 110 may partition computing resources and storage resources of one GPU into a plurality of resource subsets. Each resource subset comprises a given number of GPU kernels and storage resources. In other words, the server 110 creates multiple virtual GPUs for one physical GPU, so that multiple applications may concurrently run on the same physical GPU, thereby effectively improving the resource utilization efficiency of GPU.

In some embodiments, for example, if an application needs a huge amount of dedicated processing resources and one physical GPU cannot satisfy the processing requirement, then the server 110 may treat multiple physical GPUs as one virtual GPU for processing the application. As another example, if resources owned by one virtual GPU can satisfy the processing of multiple applications, then the server 110 may further create multiple virtual GPUs for this virtual GPU.

In an example embodiment, the server 110 may equally partition the dedicated processing resource 160 into a plurality of resource subsets 1600. For example, the server 110 may equally allocate kernels and storage resources of a GPU to a plurality of virtual GPUs. In another example embodiment, the server 110 may partition, based on a configuration parameter, the dedicated processing resource 160 into a plurality of resource subsets with different resource amounts. In one embodiment, the configuration parameter may be pre-configured in the server 110. In another embodiment, the configuration parameter may also be generated by the server 110 depending on the current situation of the dedicated processing resource. For example, when one of the multiple virtual GPUs is for processing an application that involves a large calculation amount, the server 110 may allocate more kernels of the GPU to this virtual GPU.

In some embodiments, the server 110 may partition all resources comprised in the dedicated processing resources 160 into the plurality of resource subsets 1600. In some embodiments, the server 110 may also partition currently available resources among the dedicated processing resources 160 into the plurality of resource subsets 1600, so that resources of the dedicated processing resources 160 are sufficiently utilized.

At block 320, the server 110 generates multiple corresponding indexes for the plurality of resource subsets 1600 respectively. For example, the server 110 may generate an index "000" for the resource subset 1600-1, and an index "011" for the resource subset 1600-2. The server 110 may generate an index for each subset among the resource subsets 1600 in any suitable way, so as to facilitate a lookup of the subset.

At block 330, the server 110 stores a mapping between the dedicated processing resource 160 and the generated indexes of the plurality of resource subsets. The server 110 may store the mapping in the form of a table. Also the server 110 may store the mapping in the form of a tree. The embodiments of the present disclosure are not limited herein. As an example only, if the index of the dedicated processing resource 160-1 is "00" and the indexes of the resource subsets corresponding to the dedicated processing resource 160-1 are "000," "011" and "110,"; the index of the dedicated processing resource 160-2 is "01" and indexes of resource subsets corresponding to the dedicated processing resource 160-2 are "100," "101" and "111," then a mapping between the dedicated processing resources 160-1 and 160-2 and their respective resource subsets may be stored as Table 1.

TABLE 1

| 00 | 000 | 011 | 110 |
| 01 | 100 | 101 | 111 |

In some embodiments, the server 110 may store the mapping between the dedicated processing resource 160 and the generated indexes of the plurality of resource subsets in a local memory. In another example, the server 110 may store the mapping in a remotely accessible storage device (e.g. cloud storage device).

In an example embodiment, the server 110 may generate and store a uniform resource identifier (URI) for each resource subset 1600. The uniform resource identifier comprises the Internet protocol address of the server 110, the port number of the server, and the index of the resource subset. In some embodiments, the server 110 may determine access permissions for the plurality of resource subsets 1600. Since the resource subsets may be accessed by multiple clients 120, the server 110 may set access permissions so that a specific client 120 cannot access some resource subsets 1600.

Figure 4:
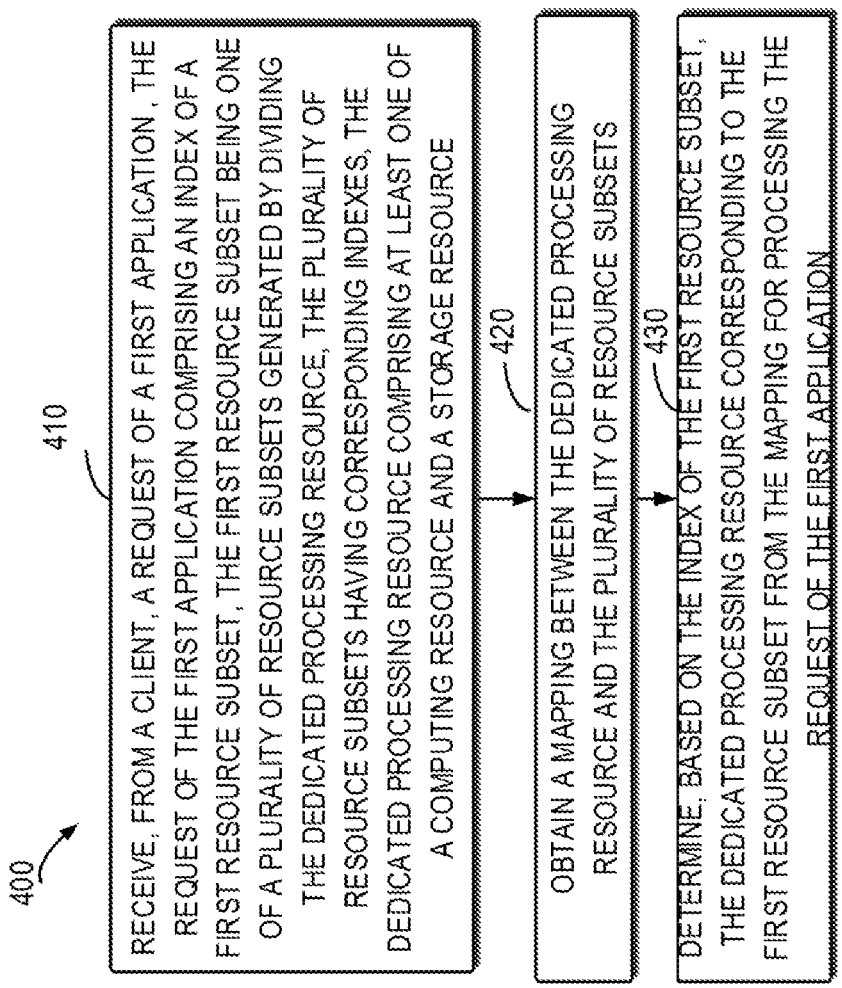
FIG. 4 shows a flowchart of a procedure or a method for processing an application according to some embodiments of the present disclosure.

FIG. 4 shows a flowchart of a method 400 for processing applications according to some embodiments of the present disclosure. In some embodiments, the server 110 may pre-create contexts for the dedicated processing resource 160.

For example, the server may initialize hardware, etc. In an example embodiment, the server 110 may further create a stream pool consisting of a plurality of streams.

At block 410, the server 110 receives a request of a first application 150-1 from the client 120, where the request of the first application 150-1 comprises an index "000" of the first resource subset 1600-1. In some embodiments, the server 110 receives requests of a first set of applications 150 from the client 120. As an example only, the server 110 may queue the received requests of the first set of applications 150 (e.g. the application 150-1, an application 150-2) in chronological order. In some embodiments, the client 120 may establish a connection with the server 110 in advance, and the scheduler 140 may allocate a matching resource subset to the first application 150-1 based on the properties of the request from the first application 150-1 (e.g. demand of the computing capability and/or demand of the storage space, etc.) and the properties of the resource subset 1600 (e.g. the calculation amount/storage space which can be provided).

At block 420, the server 110 obtains a mapping between the dedicated processing resource 160 and the plurality of resource subsets 1600. As an example only, the server 110 may obtain the mapping between the dedicated processing resource 160 and the plurality of resource subsets 1600 as shown in Table 1. In some embodiments, the server 110 may obtain the mapping from a local storage device or a remote storage device. In other embodiments, the server 110 may also configure the mapping.

At block 430, the server 110 determines, based on the index of the first resource subset, a dedicated processing resource corresponding to the first resource subset from the mapping for processing the request of the first application. As an example, if the server 110 receives a request for the first application 150-1 from the client 120 and the request of the first application 150-1 comprises the index "000" of the first resource subset 1600-1, then the server 110 may determine from the mapping shown in Table 1 and based on the index "000" that the dedicated processing resource corresponding to the first dedicated resource subset 1600-1 is 160-1, so that the server 110 processes the request of the first application 150-1 by using the dedicated processing resource 160-1.

As an example only, in some embodiments, the server 110 may directly determine based on the index "000" that the dedicated processing resource corresponding to the first resource subset 1600-1 is 160-1. In some embodiments, the server 110 may determine based on the index "000" that an index of the dedicated processing resource corresponding to the first resource subset 1600-1 is "00," and based on the index "00," the server 110 may further determine from the plurality of dedicated processing resources (e.g. the dedicated processing resource 160-1, the dedicated processing resource 160-2, etc.) that a dedicated processing resource corresponding to the index "00" is the dedicated processing resource 160-1.

In some embodiments, the server 110 may determine access permission of the first application 150-1 to the first resource subset 1600-1. If the first application 150-1 has the access permission to the first resource subset 1600-1, then the server 110 may determine a dedicated processing resource corresponding to the first resource subset 1600-1 for processing the first application 150-1. If the first application 150-1 does not have access permission to the first resource subset 1600-1, then the server 110 refuses to process the first application 150-1. In an example embodiment, the scheduler 140 may re-allocate to the first application 150-1 a resource subset that is accessible to the first application 150-1.

In other embodiments, the server 110 receives a request for the first application 150-1 and a request for the second application 150-2 from the client 120, where the request of the first application 150-1 comprises the index "000" of the resource subset 1600-1, and the request of the second application 150-2 comprises the index "011" of the resource subset 1600-2. Based on the indexes "000" and "011", the server 110 determines from the mapping shown in Table 1 that a dedicated processing resource corresponding to the first resource subset 1600-1 and the second resource subset 1600-2 is 160-1.

In some embodiments, the server 110 schedules at least one resource subset among the plurality of resource subsets to at least one request of requests of the first set of applications 150 based on the priorities of the requests of the first set of applications 150, the priorities indicating an order in which applications are processed. The priorities may be pre-configured by the server 110 or stored in a storage device accessible to the server 110. As an example only, the server 110 determines the second application 150-2 has a higher priority. As such, even if the first application 150-1 is before the second application 150-2 in the queue arranged in chronological order, the server 110 first schedules to the second application 150-2 a resource comprised in the resource subset 1600-2.

In some embodiments, the server 110 may map the first application 150-1 and the second application 150-2 to pre-created streams respectively. Since the server 110 maps different applications to different streams, these applications may be concurrently processed on the same dedicated processing resource, thereby improving the request processing efficiency. In an example embodiment, if the processing of the first application 150-1 and the second application 150-2 is completed, streams occupied by these applications are called back. It may be understood that one application may be mapped to one or more streams.

In an example embodiment, the server 110 may monitor the usage of the dedicated processing resource by the request of the first application 150-1 for billing the first application 150-1. As an example only, the server 110 may monitor GPU kernel use time, occupation of storage space and the like associated with the first application 150-1. As an example, the server 110 may save the monitoring result in a local storage device or upload the same to a cloud storage device. In some embodiments, the server 110 may bill the first application 150-1 according to the monitoring result. In other embodiments, the server may also analyze the first application 150-1 according to the monitoring result.

Figure 5:
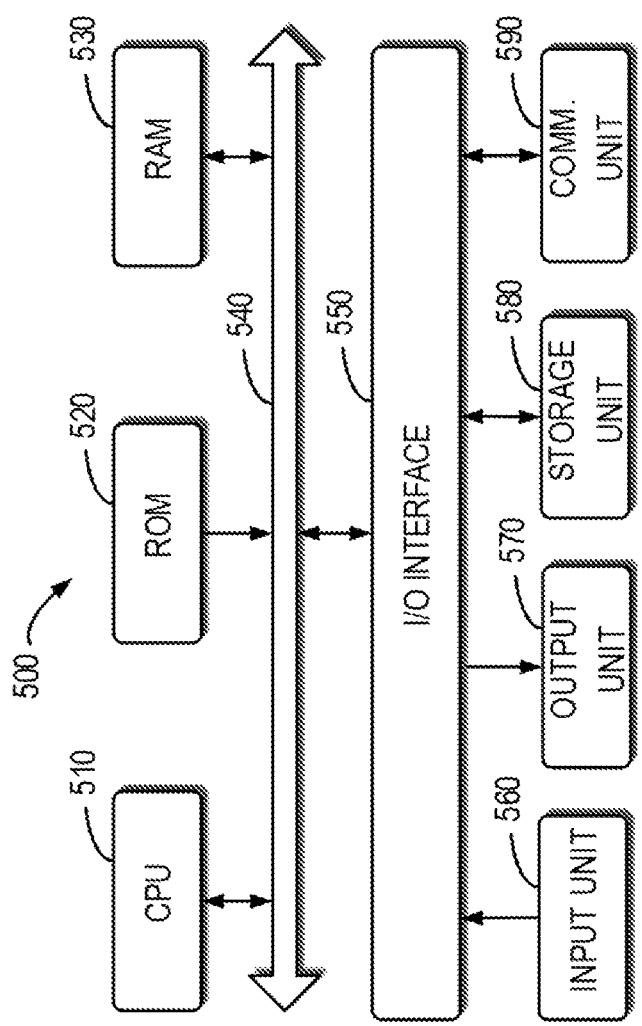
FIG. 5 shows a schematic block diagram of an electronic device for implementing the embodiments of the present disclosure.

FIG. 5 illustrates a schematic block diagram of an electronic device 500 for implementing embodiments of the present disclosure. It may be understood that the electronic device 500 includes a central process unit (CPU) 510, which can execute various suitable actions and processings based on the computer program instructions stored in the read-only memory (ROM) 520 or computer program instructions loaded in the random-access memory (RAM) 530 from a storage unit 580. The RAM 530 can also store all kinds of programs and data required by the operations of the device 500. CPU 510, ROM 520 and RAM 530 are connected to each other via a bus 540. The input/output (I/O) interface 550 is also connected to the bus 540.

A plurality of components in the device 500 is connected to the I/O interface 550, including: an input unit 560, such as a keyboard, a mouse and the like; an output unit 570, such as various kinds of displays and loudspeakers etc.; a storage unit 580, such as a magnetic disk and an optical disk etc.; and a communication unit 590, such as a network card, modem, a wireless transceiver and the like. The communication unit 590 allows the device 500 to exchange information/data with other devices via a computer network, such as Internet, and/or various telecommunication networks.

Each procedure and processing, such as methods 300 and 400, described above can also be executed by the dedicated processing resource 510. For example, in some embodiments, the procedures/methods 300 and 400 can be implemented as a computer software program tangibly included in the machine-readable medium, e.g., a storage unit 580. In some embodiments, the computer program can be partially or fully loaded and/or mounted to the device 500 via ROM 520 and/or communication unit 590. When the computer program is loaded to RAM 530 and executed by the CPU 510, one or more steps of the above described methods 300 and 400 can be implemented. Alternatively, in other embodiments, CPU 510 also can be configured in other suitable manners to realize the above procedure/method.

The present disclosure can be a method, a device, a system and/or a computer program product. The computer program product can include a computer-readable storage medium, on which the computer-readable program instructions for executing various aspects of the present disclosure are loaded.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which comprises one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing a dedicated processing resource, comprising:
   receiving, from a client, a request of a first application, the request of the first application comprising an index of a first resource subset configured for stream processing, the first resource subset being one of a plurality of resource subsets generated by dividing the dedicated processing resource, the plurality of resource subsets having corresponding indexes, the dedicated processing resource comprising at least one of: a computing resource and a storage resource;
   obtaining a mapping between the dedicated processing resource and the plurality of resource subsets; and
   determining, based on the index of the first resource subset, the dedicated processing resource corresponding to the first resource subset from the mapping for processing the request of the first application;
   wherein the method further comprises, in response to receiving requests of a first set of applications:
   queuing the requests of the first set of applications;
   scheduling a resource comprised in at least one resource subset of the plurality of resource subsets to at least one request of the requests of the first set of applications based on priorities of the requests of the first set of applications, the priorities indicating an order in which applications are processed; and
   mapping the at least one application request to at least one of a plurality of created streams.

2. The method of claim 1, wherein the method is executed by a software module.

3. The method of claim 1, wherein obtaining a mapping between the dedicated processing resource and the plurality of resource subsets comprises:
   obtaining the mapping from a storage device on which the mapping is stored.

4. The method of claim 1, wherein determining the dedicated processing resource corresponding to the first resource subset comprises:
   determining, based on the index of the first resource subset, an index of the dedicated processing resource corresponding to the index of the first resource subset from the mapping; and
   determining, based on the index of the dedicated processing resource, the dedicated processing resource from a plurality of dedicated processing resources.

5. The method of claim 1, wherein determining the dedicated processing resource corresponding to the first resource subset comprises:
   determining access permission of the request of the first application to the first resource subset; and
   in response to the request of the first application having the access permission, determining the dedicated processing resource corresponding to the first resource subset.

6. The method of claim 1, further comprising:
   monitoring a situation that the request of the first application uses the dedicated processing resource for billing the first application.

7. The method of claim 1, wherein the plurality of resource subsets are generated by equally dividing the dedicated processing resource.

8. The method of claim 1, wherein the plurality of resource subsets are generated by dividing the dedicated processing resource into resource subsets with different resource amounts based on a resource configuration parameter.

9. The method of claim 1, further comprising:
   obtaining a context created for the dedicated processing resource and at least one stream for processing a request of an application from the client; and
   processing the request of the first application by using the context and the at least one stream.

10. A device for managing a dedicated processing resource, comprising:
    at least one processor; and
    a memory coupled to the at least one processor and having instructions stored thereon, the instructions, when executed by the at least one processor, causing the device to perform acts comprising:
    receiving, from a client, a request for a first application, the request of the first application comprising an index of a first resource subset configured for stream processing, the first resource subset being one of a plurality of resource subsets generated by dividing the dedicated processing resource, the plurality of resource subsets having corresponding indexes, the dedicated processing resource comprising at least one of a computing resource and a storage resource;
    obtaining a mapping between the dedicated processing resource and the plurality of resource subsets; and
    determining, based on the index of the first resource subset, the dedicated processing resource corresponding to the first resource subset from the mapping for processing the request of the first application;
    wherein the acts further comprise, in response to receiving requests of a first set of applications:
    queuing the requests of the first set of applications;
    scheduling a resource comprised in at least one resource subset of the plurality of resource subsets to at least one request of the requests of the first set of applications based on priorities of the requests of the first set of applications, the priorities indicating an order in which applications are processed; and
    mapping the at least one application request to at least one of a plurality of created streams.

11. The device of claim 10, wherein obtaining a mapping between the dedicated processing resource and the plurality of resource subsets comprises:

obtaining the mapping from a storage device on which the mapping is stored.

12. The device of claim 10, wherein determining the dedicated processing resource corresponding to the first resource subset comprises:

determining, based on the index of the first resource subset, an index of the dedicated processing resource corresponding to the index of the first resource subset from the mapping; and determining, based on the index of the dedicated processing resource, the dedicated processing resource from a plurality dedicated processing resources.

13. The device of claim 10, wherein determining the dedicated processing resource corresponding to the first resource subset comprises:

determining access permission of the request of the first application to the first resource subset; and in response to the request of the first application having the access permission, determining the dedicated processing resource corresponding to the first resource subset.

14. The device of claim 10, wherein the acts further comprise:

monitoring a situation that the request of the first application uses the dedicated processing resource for billing the first application.

15. The device of claim 10, wherein the plurality of resource subsets are generated by equally dividing the dedicated processing resource.

16. The device of claim 10, wherein the plurality of resource subsets are generated by dividing the dedicated processing resource into resource subsets with different resource amounts based on a resource configuration parameter.

17. The device of claim 10, wherein the acts further comprise:

obtaining a context created for the dedicated processing resource and at least one stream for processing a request of an application from the client; and processing the request of the first application by using the context and the at least one stream.

18. A computer program product for managing a dedicated processing resource, the computer program product comprising:

a non-transitory computer readable medium encoded with computer-executable program code, the code configured to enable the execution of:

receiving, from a client, a request of a first application, the request of the first application comprising an index of a first resource subset configured for stream processing, the first resource subset being one of a plurality of resource subsets generated by dividing the dedicated processing resource, the plurality of resource subsets having corresponding indexes, the dedicated processing resource comprising at least one of: a computing resource and a storage resource;

obtaining a mapping between the dedicated processing resource and the plurality of resource subsets; and determining, based on the index of the first resource subset, the dedicated processing resource corresponding to the first resource subset from the mapping for processing the request of the first application;

wherein the code is further configured to enable the execution of, in response to receiving requests of a first set of applications:

queuing the requests of the first set of applications;

scheduling a resource comprised in at least one resource subset of the plurality of resource subsets to at least one request of the requests of the first set of applications based on priorities of the requests of the first set of applications, the priorities indicating an order in which applications are processed; and mapping the at least one application request to at least one of a plurality of created streams.

19. The computer program product of claim 18 wherein the plurality of resource subsets are generated by dividing the dedicated processing resource into resource subsets with different resource amounts based on a resource configuration parameter.

20. The computer program product of claim 18 wherein the code is further configured to enable the execution of:

obtaining a context created for the dedicated processing resource and at least one stream for processing a request of an application from the client; and processing the request of the first application by using the context and the at least one stream.

* * * * *